United States Patent

[11] 3,568,640

| [72] | Inventor | Horst Kuettner<br>Huntington, N.Y. |
|---|---|---|
| [21] | Appl. No. | 842,851 |
| [22] | Filed | July 18, 1969 |
| [45] | Patented | Mar. 9, 1971 |
| [73] | Assignee | The United States of America as represented by the United States Atomic Energy Commission |

[54] WIRE COATING TOOL
3 Claims, 2 Drawing Figs.

[52] U.S. Cl. .................................................. 118/405, 18/13
[51] Int. Cl. .......................................... B05c 3/02
[50] Field of Search .......................................... 118/404, 405; 18/(Vent Digest), 13 (H); 117/(Inquired); 169/(Inquired); 264/(Inquired)

[56] References Cited
UNITED STATES PATENTS

| 79,896 | 7/1868 | Bishon et al. | 118/(W&Cdie) |
| 275,859 | 4/1883 | Robertson | 118/(W&Cdie) |
| 867,659 | 10/1907 | Hoopes et al. | (118/405UX) |
| 1,033,912 | 7/1912 | Lendi | 118/405X |
| 1,454,224 | 5/1923 | Schmidt | 117/115 |
| 2,308,638 | 1/1943 | Balthis et al. | 18/(W&Cdie) |

Primary Examiner—Morris Kaplan
Attorney—Roland A. Anderson

ABSTRACT: A tool for coating a wire with a pasty material consisting of a pair of elements with a central passageway for the wire forming an annular ring containing the material, a feed gap for carrying the material to the central passageway, and a smaller venting gap extending out from said ring for releasing entrapped gases.

PATENTED MAR 9 1971

3,568,640

INVENTOR.
HORST KUETTNER

WIRE COATING TOOL

BACKGROUND OF THE INVENTION

The invention described herein was made in the course of, or under a contract with the United States Atomic Energy Commission.

The coating of an object such as a wire with a pasty material may be accomplished by passing the object through the barrel of an extruder into which the pasty material is fed under pressure.

Some of the improved plastic insulation materials such as silicone resins presently available produce insulated wires with greater heat resistance and therefore are useful in places where other types of insulation could not be used.

An important disadvantage in the use of some of these plastic insulating materials which are pasty when applied is found on their tendency to foam during extrusion. As it is important that the coating on the wire should be free of pores in order to exhibit the most desirable properties, attempts have been made unsuccessfully to overcome this problem through the use of fillers and antifoaming agents.

SUMMARY OF THE INVENTION

The aforementioned difficulties in extruding a pasty substance having the tendency to foam to the surface of an object such as a wire is accomplished in accordance with the principles of this invention by providing a tool having spaces to bleed out entrapped air or gas which would otherwise find its way into the coating. The size of these spaces depends on the viscosity of the pasty material although a wide range in viscosity can be accommodated.

It is thus a principal object of this invention to provide for the effective extrusion coating of an object with pasty materials having the tendency to foam.

Other objects and advantages of this invention will hereinafter become apparent from the following description to a preferred embodiment of this invention.

DESCRIPTION OF THE PREFERRED EMBODIMENT

Figure 2:
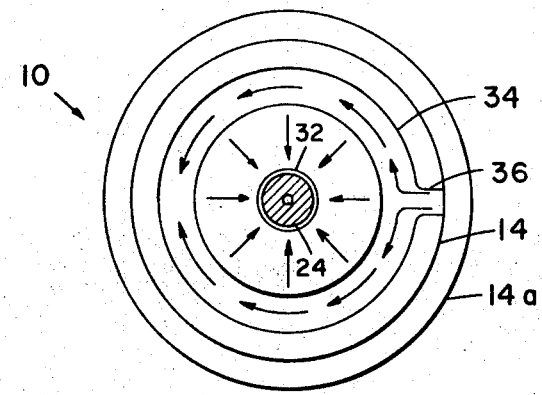
FIG. 2 is a view along 2-2 of FIG. 1.
Figure 1:
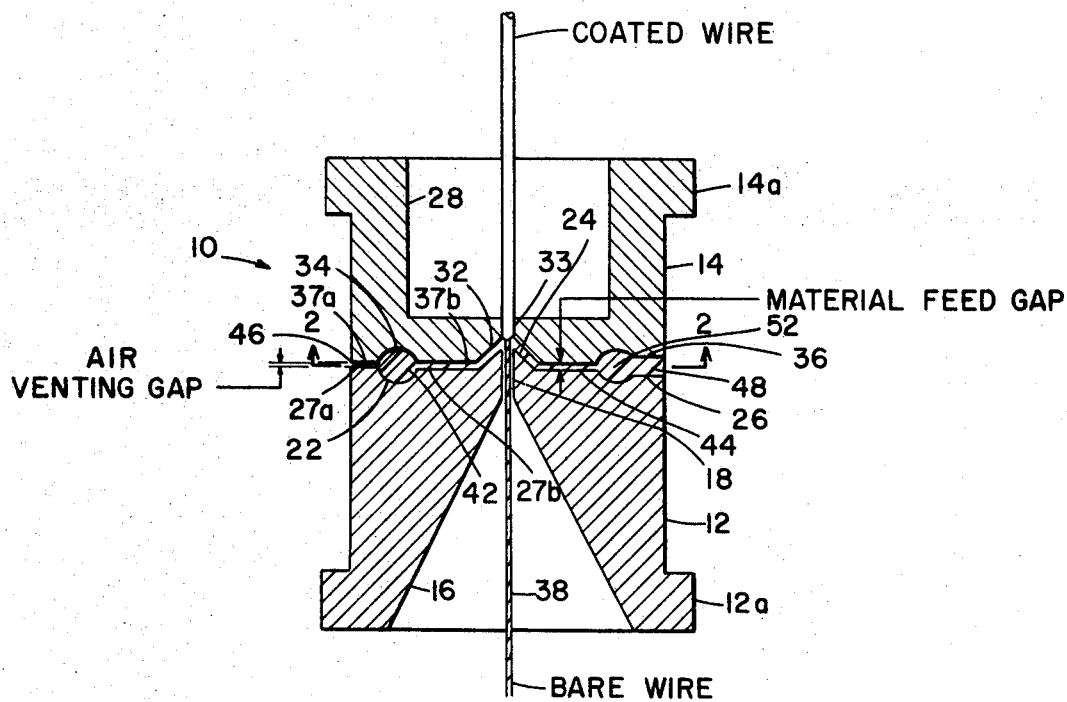
FIG. 1 is an elevation view in section of a preferred embodiment of this invention.

Referring to FIGS. 1 and 2, coating tool 10 consists of a cylindrical feed member 12a and a cylindrical outlet member 14 with flange 14a. Feed member 12 has a conical inlet section 16 leading into an axial passageway 18, an annular semicircular groove 22, a pyramidal protrusion 24 through which passage 18 extends, and a radially directed groove 26 extending from annular groove 22. Annular surface 27a is slightly higher than surface 27b within annular groove 22.

Outlet member 14 has an outlet cavity 28 and a depression 32 matching that of the protrusion 24 on member 12, and an axial passageway 33 as shown. Member 14 also has an annular semicircular groove 34 matching groove 32, and a radially directed groove 36 matching groove 26 of member 12. Annular surface extends out slightly further than surface 37b within annular groove 34.

Member 12 and 14 are assembled together as shown in FIG. 1 with their faces separated slightly as shown. Suitable brackets or struts (not shown) interconnecting flanges 12a and 14a may be utilized to maintain the assembly. Bare stranded wire 38 is pulled up through passageways 18 and 33 which together form a central passageway through tool 10 as illustrated in FIG. 1. As will be shown later, wire 38 is coated as it is withdrawn from the top of apparatus 10. When assembled as shown, tool 10 forms an annular space or hollow ring 42, an annular feed gap 44, an annular venting gap 46, and feed passageway 48. Coating material 52 would fill the space between members 12 and 14 including passageway 48, ring 42 and feed gap 44, as illustrated in FIG. 1.

In the operation of coating tool 10, the end of wire 38 to be coated in inserted up through passageways 18 and 33 and pulled through. The pasty material to coat wire 38 is supplied under pressure by any conventional means such as a screw extruder (not shown) through feed passage 48 into annular feed ring 42. The pasty coating material then fills up material feed gap 44 and coats wire 38 in the space between adjacent ends of passageways 18 and 33. Air or other gas trapped in the coating material escapes through the venting gap 46 which serves as a deairation valve to extract any air which may still be present after extrusion. The result is found to be that wire 38 emerges with a coating free of bubbles, pores or other imperfections. A typical coating material would be a thermal barrier silicon resin available commercially. The flow of pasty material is indicated by the arrows in FIG. 2.

It has been found that the size or spread of materials feed gap 44 should be, in accordance with this invention, 2 to 200 times that of the size of venting gap 46. The latter, instead of being continuous around ring 42, may be discrete in circumferential length in which event one or more may be distributed along the circumstances of tool 10. In the arrangement described, wire 38 is coated with material virtually free of pores and this coating has been found not to be effected by varying temperature and humidity condition, or whether the coating is applied in or not in a vacuum.

It is thus seen that there has been provided a unique coating tool of improved effectiveness, reliability and simplicity to use. While only a preferred embodiment has been described it is understood that many variations are possible without departing from the principles of this invention.

I claim:

1. A wire coating tool comprising a pair of spaced mating portions with a central passageway through which said wire is drawn, said portions forming an annular hollow ring surrounding and spaced from said central passageway, a feed gap extending between said ring and said passageway, at least one venting gap extending out from said ring for permitting release of trapped gases, and a supply passageway for delivering from outside of said tool coating material under pressure to said annular ring.

2. The coating tool of claim 1 in which said feed gap is 2 to 200 times the size of said venting gap.

3. The coating tool of claim 2 in which said venting gap extends circumferentially around said ring.